Figure 1:
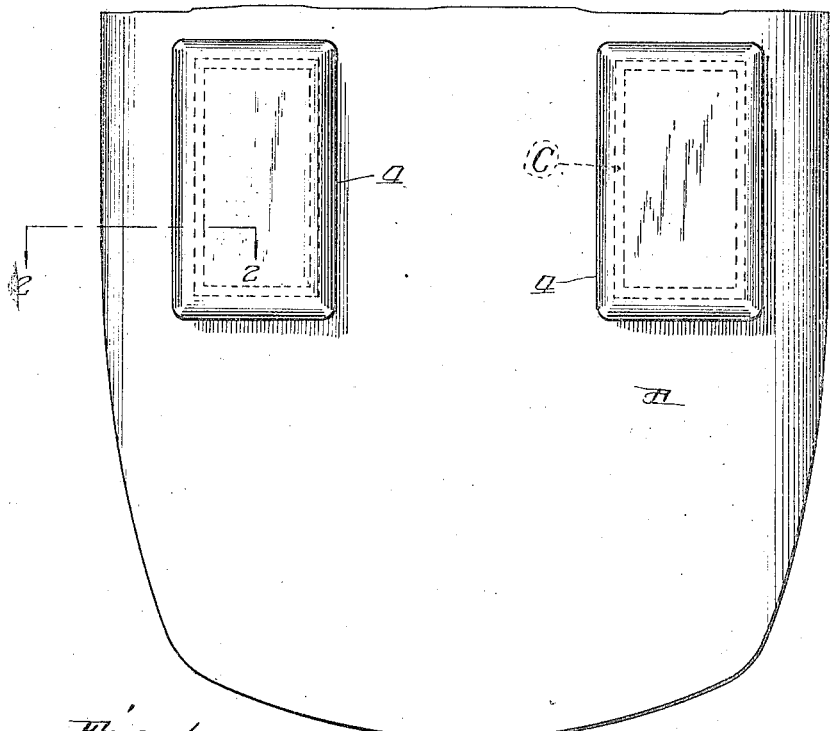

H. C. LEICHSENRING.
SYSTEM OF FENESTRATION.
APPLICATION FILED FEB. 1, 1915.

1,165,684. Patented Dec. 28, 1915.

UNITED STATES PATENT OFFICE.

HERMAN C. LEICHSENRING, OF CHICAGO, ILLINOIS.

SYSTEM OF FENESTRATION.

1,165,684.    Specification of Letters Patent.    Patented Dec. 28, 1915.

Application filed February 1, 1915. Serial No. 5,595.

*To all whom it may concern:*

Be it known that I, HERMAN C. LEICHSENRING, a citizen of the United States, residing at Chicago, in the county of Cook and State of Illinois, have invented certain new and useful Improvements in Systems of Fenestration, of which the following is a specification.

My invention relates to fenestration and more particularly to the fenestration of the roofs of vehicles and other structures of various types.

As is well known the only manner of illuminating the interior of vehicles such as railway passenger coaches, street cars, motor cars and busses and the like during the daylight hours that is at present practised is by windows in the vertical side or end walls of the vehicles. It is practically impossible by this method to admit the direct waves of light from the sky which is the best source of illumination into the interior of vehicles when passing through crowded thoroughfares and between sky-scrapers or similar tall buildings. Only the light waves reflected from the walls of the buildings will penetrate the vertical side windows of the vehicles rendering the interior of the vehicle dingy and dark and unsuitable for passengers desiring to read. It is to overcome this objection that I have designed my novel system of fenestration for vehicles.

I accomplish the result sought by providing a plurality of translucent panels in the roofs or tops of the vehicles and other structures for the purpose of admitting the direct waves of light from the sky so as to penetrate the vehicle or other roof vertically thereby permitting a greater quantity and better quality of light to enter the structure without reflection.

It is an object of my invention to construct translucent panels in a simple manner so that they may be readily placed upon vehicles now in use or buildings and structures already erected.

Another object is to provide the fenestra panels with means for securing the same to the apertures in the roof that will prevent any seepage of the atmospheric elements therethrough and prevent the rattle from the loose assemblage of the parts.

A further object of my invention is the provision of suitable attaching means that may be readily accommodated to variations or defects in the construction of either the translucent element or the flange surrounding the aperture on which the panel is mounted.

Other objects are to provide a light panel for the roofs of vehicles that is easy to attach, simple in construction and economical to manufacture.

I prefer to accomplish the various objects of my invention by the means and in the manner hereinafter fully described and as more particularly pointed out in the claims, reference being had to the accompanying drawings forming a part thereof, wherein—

Figure 2:
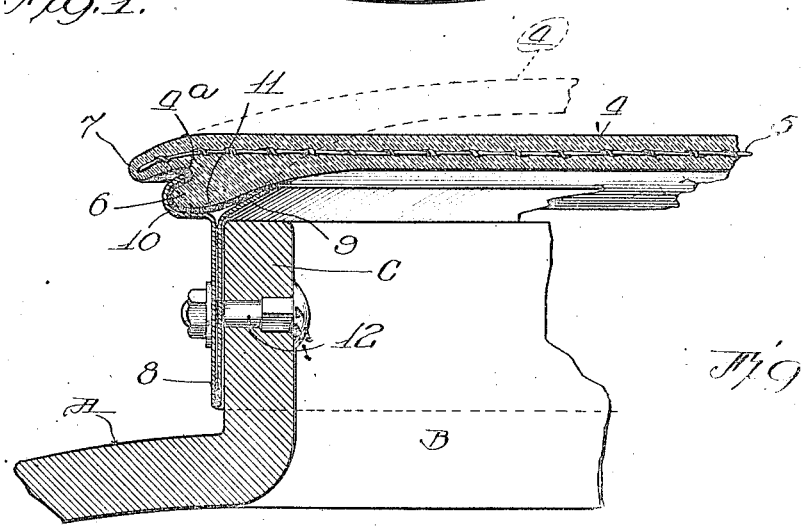

Figure 1 is a top plan of one end of a roof of a structure showing my invention applied thereto. Fig. 2 is a transverse section thereof taken on line 2—2, looking in the direction of the arrows and drawn to an enlarged scale.

In the drawings, similar reference charters indicate the same elements throughout the various figures.

A indicates a typical roof of a vehicle or other structure to which my invention may be applied through which a plurality of openings B of suitable dimensions are made. The edges of these openings are bounded by an upturned flange or shallow vertical wall C to which my improved fenestra panels or covers are secured. These panels preferably each comprises a molded sheet of transparent or translucent material 4 (of glass or other vitreous material) that is preferably reinforced with a strip or sheet of wire fabric 5 embedded therein in any well known manner. The edges of the panel are provided upon their underface with a downwardly and outwardly projecting rib 6 while the upper portion of the edges extend outwardly beyond the ribs 6 and are curved slightly downward to provide an overhanging eaves or dip 7.

The means for securing the translucent panel to the flange C of the opening comprises a metallic strip (preferably sheet copper) bent longitudinally upon itself to provide a vertical securing plate 8 that preferably surrounds and fits snugly against the exterior of flange C. The longitudinal edges of said strip are preferably separated so that the inner edge 9 which is bent obliquely fits against and supports the panel 4 along the inner portion of rib 6 and the opposite edge 10 is preferably bent outwardly and then inwardly around the rib 6 into the groove 4ª so as to securely clamp the rib 6 of the panel. A gasket 11 of rubber or the like is interposed between the clamping edges 9 and 10 prior to bending the latter edge into the groove 4ᵃ so as to effectively seal the joint and prevent the atmospheric elements seeping through and avoiding rattle. After attaching the metal strip to the panel the fixture is placed on the opening and securely clamped to the flange C by bolts 12 or otherwise which pass transversely through said flange C and the double securing plate 8.

From the above it will be obvious to others skilled in the art that various modifications or refinements of the structure herein disclosed are possible without materially departing from the spirit of my invention. It will also be obvious that the structure is readily adaptable to the roofs of buildings and similar structures, the decks of yachts and vessels, as well as to the roofs of vehicles. I therefore desire it understood that all such changes are contemplated within the scope of my invention as expressed in the appended claims.

What I claim is:—

1. Means for fenestration comprising a translucent panel provided with a substantially downwardly projecting rib, and means for securing said panel to an opening in the roof of a structure, consisting of a metal strip having the edge adjacent said panel bifurcated, one of the flanges formed by said bifurcation adapted to support said panels and the other flange adapted to be bent against and clamp said rib.

2. Means for fenestration comprising a translucent panel provided with a groove in its outer edges, and means for securing said panel to an opening consisting of a metal trip, havig its edge adjacent said panel bifurcated, one of the flanges formed by said bifurcation adapted to engage and support said panel and the other flange adapted to enter said groove and clamp said panel.

3. Means for fenestration comprising a translucent panel provided with a substantially downwardly projecting rib adjacent the edges thereof and an overhanging downwardly extending eaves, and means for securing said panel to the roof consisting of a metal strip having its upper edge bifurcated, one of the flanges formed by said bifurcation adapted to partially surround said rib and the other flange of said bifurcation adapted to support the panel upon the opposite side of said rib.

4. Means for fenestration comprising a translucent panel provided with a downwardly and outwardly projecting rib upon its under surface adjacent its edges, overhanging downwardly extending eaves beyond the vertical plane of said rib forming an annular groove therebetween, and a frame adapted to be secured to said panel comprising a metal strip having its edge adjacent the panel bifurcated, one of the flanges whereof supports the panel inside said rib and the other flange is bent around the outer portion of said rib and seated in said groove.

5. Means for fenestration comprising a translucent panel provided with a downwardly and outwardly projecting rib upon its under surface adjacent its edges, overhanging downwardly extending eaves beyond the vertical plane of said rib forming an annular groove therebetween, and a frame adapted to be secured to said panel comprising a metal strip bent longitudinally upon itself and the edges of said strip opposite its bend being flanged in opposite directions, one of which flanges is adapted to support said panel and the opposite flange is adapted to be bent around said rib and seated in said annular groove.

6. Means for fenestration comprising in combination a roof provided with apertures having flanges extending therefrom, of a translucent panel provided with a substantially downwardly projecting rib, and means for securing said panel to an opening in the roof consisting of a metal strip having the edge adjacent said panel bifurcated, one of the flanges formed by said bifurcation adapted to support said panels and the other flange adapted to be bent against and clamp said rib.

7. Means for fenestration comprising in combination a roof of a translucent panel provided with substantially downwardly projecting rib, and means for securing said panel to an opening in the roof consisting of a metal strip having the edge adjacent said panel bifurcated, one of the flanges formed by said bifurcation adapted to support said panels and the other flange adapted to be bent against and clamp said rib.

In witness whereof, I have hereunto set my hand and seal, this 28 day of January, 1915.

HERMAN C. LEICHSENRING. [SEAL.]

Witnesses:
GEORGE O. HLAVIN,
WM. HAROLD EICHELMAN.

Copies of this patent may be obtained for five cents each, by addressing the "Commissioner of Patents, Washington, D. C."